US00RE35710E

United States Patent [19]

Shinmura

[11] E Patent Number: Re. 35,710

[45] Reissued Date of Patent: Jan. 6, 1998

[54] HEAT EXCHANGER HAVING A RADIATOR AND A CONDENSER

[75] Inventor: Toshiharu Shinmura, Isesaki, Japan

[73] Assignee: Sanden Corporation, Gunma, Japan

[21] Appl. No.: 561,588

[22] Filed: Nov. 21, 1995

Related U.S. Patent Documents

Reissue of:

[64] Patent No.: 5,000,257
Issued: Mar. 19, 1991
Appl. No.: 426,084
Filed: Oct. 24, 1989

[30] Foreign Application Priority Data

Oct. 24, 1988 [JP] Japan ..... 63-137745 U

[51] Int. Cl.[6] ..... F28D 21/00

[52] U.S. Cl. ..... 165/140; 165/67; 165/135; 180/68.4

[58] Field of Search ..... 165/41, 67, 140, 165/135; 123/41.33, 41.49, 41.65; 180/68.4

[56] References Cited

U.S. PATENT DOCUMENTS

| | | |
|---|---|---|
| 2,505,790 | 5/1950 | Panthofer . |
| 3,232,343 | 2/1966 | Lindstrand et al. . |
| 4,063,431 | 12/1977 | Dankowski . |
| 4,137,982 | 2/1979 | Crews et al. . |
| 4,138,857 | 2/1979 | Dankowski . |
| 4,139,857 | 2/1979 | Takagi et al. . |
| 4,190,105 | 2/1980 | Dankowski . |
| 4,367,793 | 1/1983 | MacIntosh . |
| 4,531,574 | 7/1985 | Hoch . |
| 4,590,892 | 5/1986 | Nose et al. . |
| 4,651,816 | 3/1987 | Struss et al. . |
| 5,000,257 | 3/1991 | Shinmura . |

FOREIGN PATENT DOCUMENTS

| | | |
|---|---|---|
| 0021651 | 1/1981 | European Pat. Off. . |
| 1191160 | 2/1958 | France . |
| 2423440 | 11/1975 | Germany . |
| 58-67918 | 4/1983 | Japan . |
| 61-202084 | 9/1986 | Japan . |
| 539970 | 9/1941 | United Kingdom . |
| 2113819 | 8/1983 | United Kingdom . |

*Primary Examiner*—Allen J. Flanigan
*Attorney, Agent, or Firm*—Baker & Botts, L.L.P.

[57] ABSTRACT

A heat exchanger is disclosed which comprises first and second cores aligned substantially parallel to each other in a horizontal arrangement. Each of the first and second cores includes a plurality of substantially parallel, spaced-apart, flat tubes disposed in a vertical arrangement. A plurality of corrugated fins are located in and extend through the spaces. First and second header pipes are connected to either end of the flat tubes of the first core to permit fluid flow. Third and fourth header pipes are connected to either end of the flat tubes of the second core to permit fluid flow. First and second plates are disposed on both upper and lower ends of said first and second cores to securedly affix them. Therefore, since the first and second cores for use as a condenser and a radiator can be manufactured with the same production process, the cost of manufacturing the heat exchanger is reduced. Further, since the heat exchanger has a condenser and a radiator, it can be easily attached in an automobile engine.

10 Claims, 2 Drawing Sheets

HEAT EXCHANGER HAVING A RADIATOR AND A CONDENSER

Matter enclosed in heavy brackets [ ] appears in the original patent but forms no part of this reissue specification; matter printed in italics indicates the additions made by reissue.

TECHNICAL FIELD

The present invention relates to a heat exchanger, rand more particularly, to a heat exchanger which includes a first core for use as a condenser and a second core for use as a radiator.

BACKGROUND OF THE INVENTION

The number of factory installed automotive air conditioning systems is increasing in these modern times. A condenser in the air conditioning system is generally disposed forward of a radiator since the temperature of a fluid in the condenser can become higher than that of a fluid in the radiator.

However, since the configuration of the condenser is different from that of the radiator as shown in FIGS. 1 and 2, the condenser and the radiator are manufactured during separate production processes, respectively, thereby increasing production costs. In addition, installing the condenser and the radiator in the automobile is also done separately, and it takes much time to attach them thereto.

Accordingly, it has been proposed to the prior art to use a heat exchanger in an automotive air conditioning system which functions as a condenser and a radiator as disclosed in Japanese patent application Laid-open Gazette No. 63-91488 and Japanese Utility Model Laid-open Gazette No. 63-74970. The prior art heat exchangers include a first core for a condenser and a second core for a radiator, which are aligned vertically in series. Therefore, it is necessary to enlarge the plane area thereof to maintain the same effective area for heat exchange as in a conventional condenser and radiator. This increased planar area creates difficulty during installation in an automobile engine compartment.

SUMMARY OF THE INVENTION

It is a primary object of the invention to provide a heat exchanger which can be manufactured at low cost.

It is another object of this invention to provide a heat exchanger which can be easily installed in an automobile engine component.

It is a further object of the invention to provide a compact heat exchanger.

A heat exchanger according to the present invention comprises first and second cores which are aligned parallel to each other in a horizontal arrangement. Each of the first and second cores includes an associated plurality of parallel flat tubes disposed in a vertical arrangement with a space between any two immediately adjacent flat tubes in the associated plurality, respectively. A plurality of corrugated fins are located in and extend through the spaces. First and second header pipes are each connected to one end of the flat tubes of the first core to communicate therebetween. Third and fourth header pipes are each connected to one end of the flat tubes of the second core to communicate therebetween. First and second plates are disposed on both the upper and lower ends of said first and second cores to securedly fix thereof.

Further objects, features and other aspects of this invention will be understood from the following detailed description of the preferred embodiments of this invention when read in conjunction with the annexed drawings.

DETAILED DESCRIPTION OF THE PREFERRED EMBODIMENT

Figure 1:
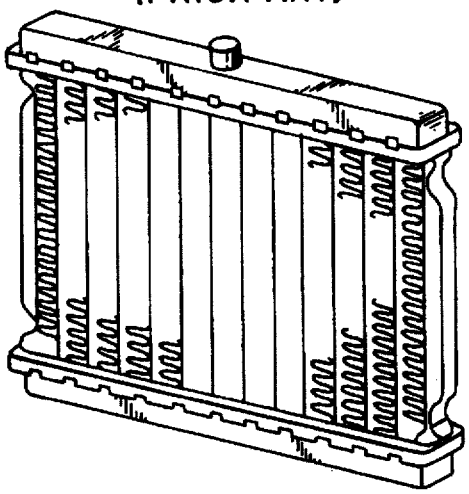
FIG. 1 (PRIOR ART)
FIG. 1 is a perspective view of a prior art radiator.
Figure 2:
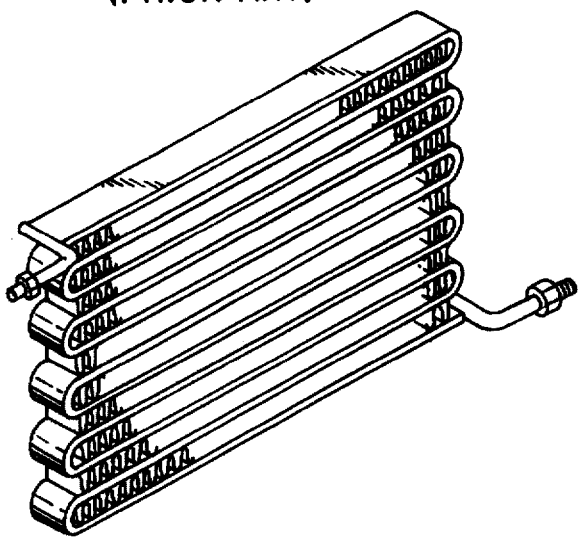
FIG. 2 (PRIOR ART)
FIG. 2 is a perspective view of a prior art condenser.
Figure 4:
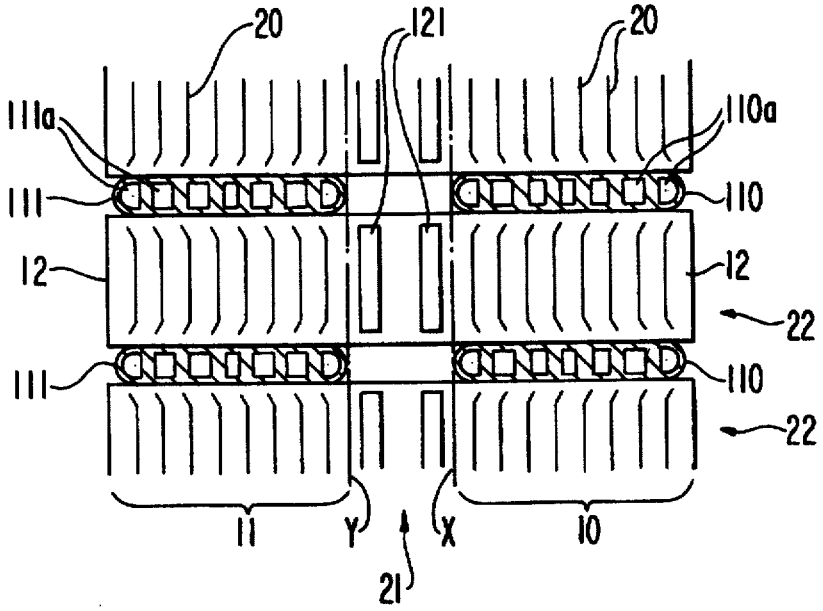
FIG. 4 is a cross-sectional view of a heat exchanger taken along line A—A as shown in FIG. 3.
Figure 3:
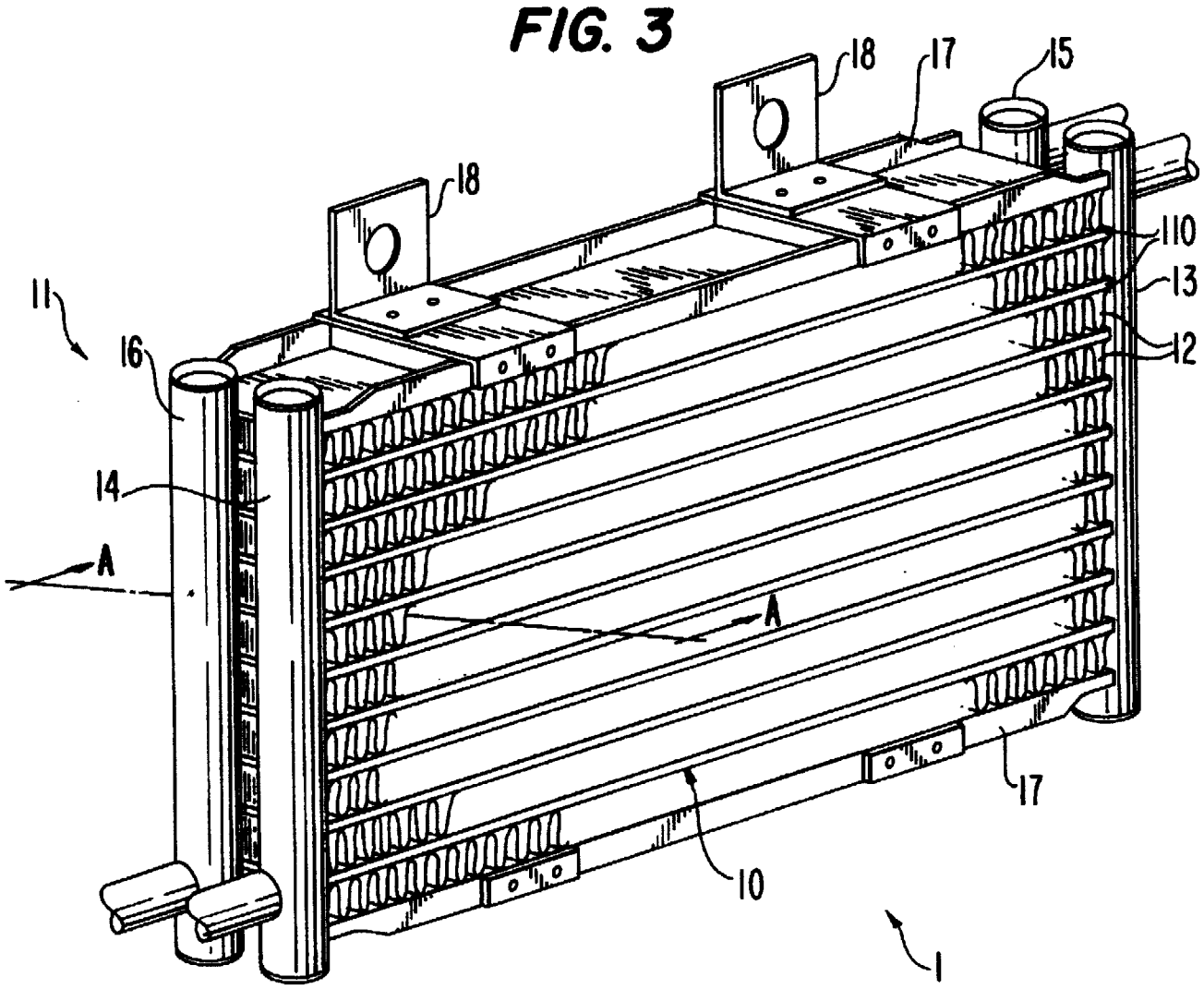
FIG. 3 is a perspective view of a heat exchanger in accordance with one embodiment of this invention.

With reference to FIGS. 3 and 4, there is shown a construction of a heat exchanger in accordance with one embodiment of this invention. For purposes of clarity only, the following descriptive locations are defined. A forward location in FIGS. 3 and 4 is toward the left side of the figures; a rear location is toward the right side of the figures; a top location is toward the top side of the figures; and a bottom location is toward the bottom side of the figures. Since those descriptive locations are provided for purposes of clarity only, they do not limit the scope of the invention thereto.

Heat exchanger 1 includes first core 10 and second core 11 located forward of first core 10. First core 10 has a plurality of flat tubes 110 that include a plurality of fluid passageways 110a. Second core 11 has a plurality of flat tubes 111 that include a plurality of fluid passageways 111a. A plurality of corrugated fins 12 are provided for radiating heat. Preferably, corrugated fins 12 are common to both the first and second cores, although the invention is not limited in this respect. Preferably flat tubes 110, 111 are aligned along reference surfaces X, Y, respectively with a substantially horizontal gap 21 therebetween and substantially vertical spaces 22 therebetween so that they are substantially parallel to each other and spaced apart. Preferably, reference surfaces X, Y are disposed along the sides of the heat exchanger. It is also preferable to secure reference surfaces X, Y at the top and bottom to reinforcing members 17. Corrugated fins 12 are disposed in and extend through spaces 22 and are attached to the outer surfaces of the flat tubes in any conventional manner, preferably by brazing.

As best seen in FIG. 4, each fin 12 is preferably common to both cores 10, 11. Fins 12 preferably extend continuously from the front of core 11 to the rear of core 10. Preferably cores 10, 11 function independently. To this end core 10 has an inlet header pipe 13 and an outlet header pipe 14. Inlet 13 and outlet 14 are connected by flat tubes 110. Likewise, core 11 has an inlet header pipe 15 and an outlet header pipe 16. Inlet 15 and outlet 16 are connected by flat tubes 111. Both cores exchange heat with the surrounding air.

To reduce the direct heat exchange between cores 10, 11 and to facilitate the independent functioning of cores 10, 11, preferably a plurality of apertures or slits 121 are formed through corrugated fins 12 at a location preferably within horizontal gap 21 between first and second cores 10, 11. Alternatively it is contemplated to dispose louvers (not shown) on the fins preferably within gap 21 between tubes 110, 111 to reduce direct heat exchange between cores 10, 11. It is possible to provide insulation or other conventional mechanisms for reducing the direct heat exchange, but they are not as practical.

Header pipe 13 is connected to one end of flat tubes 110 and header pipe 14 is connected to the other end thereof.

Likewise, header pipe 15 is connected to one end of flat tubes 111 and header pipe 16 is connected to the other end thereof.

Reinforcing members 17 are attached on the upper and lower end surfaces of first and second cores 10, 11 to secure the engagement between first and second cores 10, 11. Brackets 18 are attached on respective reinforcing members 17 to attach heat exchanger 1 within an automobile engine compartment.

Heat exchanger 1 is disposed in the front of an engine compartment. First core 10 is preferably used as a radiator for cooling an engine and second core 11 is preferably used as a condenser for an automotive air conditioning system. Heat exchange between the air and corrugated fins 12 occurs best while driving an automobile. The width of flat tubes 110 is not always the same as the width of flat tubes 111. Each width depends on the effective coefficient for heat exchange of the heat exchanger.

Indica 20 are provided on fins 12 to true the fins with the rear ends of flat tubes 110 and the front ends of flat tube 111. Preferably indicia 20 are in the form of substantially vertically-disposed lines, but may take the form of any conventional indicia. Providing indicia 20 on the fins facilitates adjusting the fin's position on the tubes prior to the operation that secures the fins to the tubes.

This invention has been described in detail in connection with the preferred embodiments, but these embodiments are for illustrative purpose only and the invention is not restricted thereto. It will be easily understood by those skilled in the art that other variations and modifications can be made within the scope of this invention, which is defined only by the following claims.

I claim:

1. A heat exchanger comprising:

first and second cores aligned parallel to each other, each of said cores including a plurality of flat tubes disposed in parallel with a space therebetween, and a plurality of corrugated fins located in and extending through the spaces between said flat tubes in each of said first and second cores, said corrugated fins including a plurality of slits located between said first and second cores;

header pipes connected to opposite ends of said flat tubes of said first and second cores;

said header pipes being in fluid communication with said flat tubes; and flat and second plates disposed on the upper and lower ends of said first and second cores to securely fix said first and second cores together.

2. The heat exchanger according to claim 1 wherein said corrugated fins are common to both of said cores.

3. A heat exchanger comprising:

first and second cores, each of said cores including a *first and second header and a plurality of parallel flat tubes connected between the first and second headers, the* plurality of parallel flat tubes arranged with a first predetermined space therebetween, a second predetermined space maintained between *the headers and tubes of* said first and said second core; and a plurality of corrugated fins arranged such that each fin is positioned in the first predetermined space between a first and a second flat tube of said first core and in the first predetermined space between a first and a second flat tube of said second core, each of said fins extending through said second predetermined space.

4. [The] *A* heat exchanger [of claim 3] *comprising:*

*first and second cores, each of said cores including a plurality of parallel flat tubes arranged with a first predetermined space therebetween, a second predetermined space maintained between said first and said second core; and*

*a plurality of corrugated fins arranged such that each fin is positioned in the first predetermined space between a first and a second flat tube of said first core and in the first predetermined space between a first and a second flat tube of said second core, each of said fins extending through said second predetermined space;* wherein said corrugated fins include a plurality of slits located between said first and second cores.

5. A heat exchanger for use as a radiator and a condenser comprising:

a first *core comprising first and second headers and a* plurality of fluid-conducting tubes *connected between the first and second headers of the first core, the first core* forming a radiator;

a second *core comprising first and second headers and a* plurality of fluid-conducting tubes *connected between the first and second headers of the second core, the second core* forming a condenser;

*a predetermined space between the headers and tubes of the first and second core;* each of said radiator and said condenser having an inlet and an outlet, each of said radiator and said condenser having an upper and a lower surface;

means for connecting said radiator to said condenser, said radiator and condenser being disposed in a spaced, side by side relationship;

and a plurality of corrugated fins common to both said radiator and said condenser.

6. [The] *A* heat exchanger [according to claim 5] *for use as a radiator and a condenser comprising:*

*a first plurality of fluid-conducting tubes forming a radiator;*

*a second plurality of fluid-conducting tubes forming a condenser;*

*each of said radiator and said condenser having an inlet and an outlet, each of said radiator and said condenser having an upper and a lower surface;*

*means for connecting said radiator to said condenser, said radiator and condenser being disposed in a spaced, side by side relationship;*

*and a plurality of corrugated fins common to both said radiator and said condenser;* wherein said connecting means is disposed on one pair of the pair of upper and the pair of lower surfaces of said radiator and said condenser.

7. A heat exchanger comprising:

a first core having a plurality of fluid-conducting tubes and a plurality of fins associated therewith;

a second core having a plurality of fluid-conducting tubes and a plurality of fins associated therewith wherein at least a portion of said fins are common to and connected to said first and second cores, and means disposed between said first and second cores for reducing the direct heat transfer between said first and second cores.

8. The heat exchanger according to claim 7 wherein said common fins extend from the front of said first core to the rear of said second core.

9. The heat exchanger according to claim 7 wherein all of said fins are common to said first and second cores.

10. The heat exchanger according to claim 1 wherein said means comprises at least one aperture disposed in each of said common fins.

* * * * *